United States Patent [19]

More et al.

[11] 3,926,042
[45] Dec. 16, 1975

[54] METHOD AND APPARATUS FOR FOLLOWING THE MOTION OF A DATUM MARK

[75] Inventors: Arthur Rowlatt More, Oxted; Robert John Whittington, Sevenoaks, both of England

[73] Assignee: H. W. Wallace & Company, Limited, England

[22] Filed: Feb. 19, 1974

[21] Appl. No.: 443,755

[52] U.S. Cl. .......................... 73/88 A; 73/95; 356/32
[51] Int. Cl.[2] .......................................... G01B 11/16
[58] Field of Search ..... 73/88 A, 95, 15.6, DIG. 11; 33/DIG. 3, 125 A; 356/32; 318/640

[56] References Cited
UNITED STATES PATENTS

| | | | |
|---|---|---|---|
| 3,120,780 | 2/1964 | Vodra et al. | 73/88 A X |
| 3,435,231 | 3/1969 | Griffiths et al. | 356/32 X |

FOREIGN PATENTS OR APPLICATIONS

| | | | |
|---|---|---|---|
| 892,432 | 3/1962 | United Kingdom | 73/95 |

OTHER PUBLICATIONS
Instrumentation, Vol. 13, No. 1, pp. 11–13, Jan. 1960.

*Primary Examiner*—Charles A. Ruehl
*Attorney, Agent, or Firm*—Marn & Jangarathis

[57] ABSTRACT

An optical-electronic apparatus for following the motion of a bench mark automatically by the motion of a carriage carrying the optical apparatus, particularly in means for ascertaining the tensile properties of materials, and in which high resolution of the apparatus is possible by placing reliance upon the provision of two forms of automatic gain control the one to maintain a constant loop gain and the other to nullify spurious signals due to vibration and other mechanical effects due to motion of the parts of the apparatus during operation of the same.

8 Claims, 9 Drawing Figures

METHOD AND APPARATUS FOR FOLLOWING THE MOTION OF A DATUM MARK

This invention relates to a method and apparatus for following the motion of a datum mark, in particular, but not exclusively, in relation to means for ascertaining the tensile properties of materials.

When the method and apparatus hereinafter described is used in relation to means for ascertaining the tensile properties of materials, an elongate sample of the material of the suitable corss-sectional shape and dimension is attached at remote positions thereon in a tensile testing machine and a stress is applied by moving the said attachments one away from the other while measuring the applied stress and the strain produced in the material, thereby to ascertain the tensile properties of the material.

Such a method and apparatus is applicable over an extremely wide range of materials from, for example, high tensile steel on the one hand to extremely thin and fragile filaments of plastics material upon the other.

When the material is of considerable strength, methods and apparatus involving the attachment of indicating means or extension detecting devices such as transducers at spaced points upon the test piece, are practical as they do not impart a load to the test piece which will influence the results obtained to any substantial extent, but if the test piece is extended to such an extent as to fracture the material the detecting devices may be damaged. Also, when testing, for example, a material such as glass reinforced plastics the materials shatters as it fractures and any extension detecting device attached thereto is liable to fall to the ground and be damaged. On the other hand where the test piece is fragile, it is impractical to make any attachment whatever to the test piece, as it will not only impart an additional load to the test piece but will also distort it, any any means for clamping an attachment thereto is likely to change the corss-sectional area of the test piece. hand where the test piece is fragile, it is impractical to make any attachment whatever to the test piece, as it will not only impart an additional load to the test piece but will also distort it, and any means for clamping an attachment thereto is likely to change the cross-sectional area of the test piece.

In some circumstances it is necessary to carry out a test with the test piece at a raised temperature, and this is detrimental to the efficient working or even distructive of an extension detecting device attached to the workpiece.

It is known at present to observe a pair of bench marks upon a test piece by means of optical means viewed by a pair of operators and to move the optical means as the bench marks move apart to follow and measure the extension of the test piece. This is only practical when the test is completed in a reasonable period of time. Where, however, a creep test is to be made, which may cover many days or weeks, such a method is impractical.

Furthermore, it is sometimes required to periodically inrease and decrease the load imparted to the test piece to asertain its extent of recovery with decrease of load after a period of elongation, particularly this is so in the case of elastomers.

The method and apparatus for following the motion of a datum mark constructed in accordance with the present invention is particularly adapted to overcome all the difficulties above referred to, seeing that not attachment is required to the test piece, whatever material it is constructed of, will follow the motion of a data mark in either direction and motion automatically, and will operate continuously if required for days or weeks on end without attention and can be positioned at such a distance from the test piece that it will not be adversely affeted by the application of heat or cold to the workpiece in a suitable oven or container provided with a window therein.

The values of the characterics of the component parts of the apparatus constructed in accordance with the invention maybe so chosen as to adapt the apparatus for use with the material from one extreme end of a range of modulus of elasticity to the other end of said range, to make it adaptable for use with an extremely wide range of material. For example, it may be stated that when adapted to give a high value of resolution, movements of the bench mark of ±0.00005 inches may be followed with accuracy over a range of distance greater than is required under the most extreme practical conditions.

In order to simplify the description of the method and apparatus of the invention particular attention is directed hereinafter to an apparatus for testing rubber, and for that purpose a test piece of a standard special character is used, and a novel form of bench mark is preferred in order to maintain the greatest accuracy in those materials which are highly elastic. The reason for this is that as the rubber stretches so does the bench mark get wider and wider, and it is essential that at not time during the operation of the device should the bench mark become so wide as to cover the whole of the optical field of the apparatus. Where the material is highly elastic the novel bench mark is preferred, but where the material is of considerably less elasticity, a plane bench mark such as a straight line or ring around the material may be used instead, as will be apparent to anyone skilled in this art, as the description hereinafter is followed. In order that those not so familiar with this form of apparatus may be fully informed as to the relationship between the invention and the prior art the testing of rubber is mentioned as an introduction to the subject matter, and for the purpose of making the salient features of the present invention more easily understood.

It is normally accepted practice when testing rubber, for example, for its tensile properties, to prepare what is known as a dum-bell testpiece of a standard specified size, which is marked with two parallel lines across the narrow portion, at a specified distance apart from one another, and which are usually called bench marks or datum marks. The testpiece is placed in a tensile testing machine and gripped at the wide tabs at its ends. One of the grips which hold the testpiece is then moved away from the other one, usually at the standard speed of 20 inches per minute. It is usual for one grip to be attached to a force measuring device while the other is moved usually downwards at the standard speed.

Different types of test results may be provided by the above apparatus, for instance, it may be required to know the force and elongation at the instant of rupture, but it may be required to know the force applied at certain percentages of elongation and so on. At one time it was the practice for the operator of the apparatus to measure the distance between the datum marks with a marked scale or by means of a pair of dividers.

Such a device has also been provided with a press switch which can be pressed whenever it is required to record the force measurement upon a recording sheet, but, as will be appreciated, it is difficult to measure accurately the distance between the datum marks by the above method owing to the fact that both marks are moving, usually at different speeds. Likewise, it is difficult to make a measurement as the testpiece ruptures. Not only is skill required but judgement as well, and it is not possible to make a second check test on a broken testpiece. The measurement is also made more difficult as the widths of the datum marks increase as the rubber stretches.

In our British Pat. No. 892,432 an apparatus is disclosed in which the motion of each of the datum marks is followed by a carriage upon a vertical column, each carriage having thereon a pair of lamps which illuminate the associated datum mark, the image of which is formed upon a photocell also upon each carriage. The two lamps on each carriage are modulated in antiphase, and the areas illuminated by the two lamps on each carriage are positioned adjacent one another and overlap at the datum marks. When the photocell is opposite the datum mark the output of the photocell is balanced, while when the datum mark moves the output becomes unbalanced in a direction depending upon the direction of movement of a datum mark. The signal derived from each photocell is amplified after suitable modification and applied to an electric motor which moves its associated carriage along the vertical column in that direction necessary to maintain the photocell opposite the associated bench mark or move it into line with the bench mark as necessary.

In the form of construction above described the two motors are mounted on the base of the apparatus and the carriages are driven from the motors by pulleys and wires. When a "stress-strain" graph directly on paper is required a recording drum is provided driven from the two motors by a differential gear, while a recording pen is moved across the drum in proportion to the stress exhibited by the testpiece.

The above apparatus, although it will provide a theoretical accuracy of alignment of at least one-fiftyth of an inch, has disadvantages both due to the use of modulated light systems and the use of driving wires for the carriages. The latter in particular, seeing that this arrangement presents difficulties when the apparatus is required to be adapted quickly to paths of movement of the carriages which vary considerably in length, when carrying out tests on testpieces of different lengths, and of different materials.

The object of the present invention is to provide a method and apparatus for following the motion of a datum mark particularly but not exclusively, in relation to means for ascertaining the tensile properties of materials which overcome the disadvantages above referred to.

The invention consists in a method of following the motion of a datum mark in a direction transversely of an imaginary line and the position of which the datum mark is provided to indicate, and in which the light reflective characteristic of the datum mark is different from a medium which supports the mark, characterised in illuminating the datum mark and the medium adjacent the datum mark by light of a constant or substantially constant intensity, forming an image thereof upon a photo-electric cell having a pair of light sensitive electrodes closely adjacent one another with the imaginary line parallel to the boundary between the electrodes, deriving a pair of electric signals from the photo-electric cell, comparing the signals and deriving a difference signal therefrom, amplifying the difference signal and applying it to an electric motor to drive it in either direction of rotation, the direction depending upon which of the signals from the photo-electric cell is of greater amplitude, the motor being mounted upon a carriage for supporting the photo-electric cell, while the carriage is mounted for movement by the electric motor along a path uniformly spaced from the path followed by the datum mark.

The invention further consists in a method of following the motion of each of a pair of datum marks in a direction transversely of a pair of parallel imaginary lines, the position of each of which datum mark is provided to indicate and in which the light reflective characteristic of each datum mark is different from a medium which supports the pair of datum marks, characterised in illuminating the datum marks and the medium adjacent each datum marks by light of a constant or substantially constant intensity, forming an image thereof upon a photo-electric cell having a pair of light sensitive electrodes closely adjacent one another, with the imaginary line parallel to the boundary between the electrodes in the respective cells, deriving a pair of electric signals from each photo-electric cell, comparing the signals in each pair of signals the one with the other and deriving a difference signal therefrom, amplifying each of the difference signals separately and causing each amplified difference signal to operate an electric motor in either direction of rotation, the direction depending upon which of the signals of each pair of signals is of greater amplitude, each motor being mounted upon a carriage for supporting the associated photo-electric cell while both carriages are mounted for movement by their associated electric motor along a rail positioned paralled to the plane in which the motion of the datum marks takes place and at right angles to the said imaginary lines.

The invention still further consists in a method as set forth in the preceding paragraph in which the medium which supports the datum marks is a testpiece of a meterial under test, in which the testpiece is held between two support means, at least one of which is moved so as to cause motion relative to one another to stress the material under test, while the datum marks are placed initially on the material between the support means spaced from one another a predetermined distance to indicate imaginary lines at right angles to the direction of motion of the support means, while indicating and/or measuring means are provided to indicate and/or measure the distance between the carriages during the relative motion of the support means, to indicate and/or measure the strain imparted to the sample by said stress.

The invention still further consists in an apparatus for following the motion of a datum mark characterised in comprising a rectilinear rail, support means for the rail, a carriage movable longitudinally of the rail and supported thereby, a reversible electric motor on the carriage the drive of which makes driving engagement with the rail, an electric lamp means on the carriage arranged top illuminate a datum mark positioned adjacent the rail, a photo-electric cell on the carriage having a pair of light sensitive electrodes of the photo-electic cell, boundary between the electrodes being rectilinear and at right angles to the longitudinal axis of the rail, means for deriving an electric signal from each light sensitive electrode of the photo-cell, means for comparing the signals the one with the other and deriving a difference signal therefrom, means for amplifying the difference signal and means for applying the difference signal to the electric motor of a polarity as will operate the motor in that direction of rotation as will tend to maintain or will move the carriage in such direction as to restore the position of the image of the datum mark symmetrical with the boundary between the electrodes in the photo-cell as and when the datum mark moves along the path parallel to the said rail.

The invention still further consists in an apparatus for carrying out the method as set forth above comprising a rectilinear rail, support means for the rail a pair of carriages movable longitudinally of the rail and supported thereby, a reversible electric motor on each carriage, the driving member of which makes driving engagement with the rail, and an electric lamp means on each carriage arranged to illuminate an associated datum mark positioned adjacent the rail, a photo-electric cell on each carriage, each cell having a pair of light sensitive electrodes closely adjacent one another, optical means for projecting an image of the respective datum marks on the light sensitive electrodes of the photo-electric cells, the boundary between the electrodes being rectilinear and at right angles to the longitudinal axis of the rail, means for deriving an electric signal from each light sensitive electrodes of each cell, means for comparing the signals in each pair of signals the one with the other and deriving a difference signal therefrom, means for amplifying each of the difference signals separately and means for applying the difference signal to the respective motors of a polarity which will operate the motor in that direction of rotation as will tend to maintain or will move the carriage in such direction as to restore the position of the image of the datum mark symmetrical with the boundary between the electrodes in each photo-electric cell as and when the respective datum mark moves along a path parallel to the said rail.

The invention still further consists in an apparatus as set forth in the preceding paragraph adapted to indicate and/or measure the strain imparted to a testpiece of rubber or other extensible material to ascertain its physical characteristics, in which the sample is mounted between support means at least one of which is movable away from the other to stress the testpiece in a direction parallel to the said rail, and in which there are provided upon the testpiece a pair of datum marks which indicate imaginary lines across the sample initially at a predetermined distance apart, so that as the sample is stressed the datum marks become further separated and the carriages move upon the rail to follow the movements of the datum marks, there being provided means for indicating and/or measuring the change of distance between the carriages and in consequence the strain imparted to the testpiece by the stress.

The invention still further consists in an apparatus as set forth in the preceding paragraph in which the means for indicating and/or measuring the change of distance between the carriages includes a toothed bar supported at one end on one of the carriages and slidable adjacent an electric switch on the other carriage, so that with relative movement of the carriages away from one another the electric switch is operated by a tooth on the bar, the teeth on the bar being equally spaced so that with separation of the carriages the switch operates in a predetermined relationship with a change of distance between the carriages and a signal so produced is applied to an apparatus which indicates and/or measures the change of distance between the carriages.

The invention still further consists in an apparatus set forth above in which the means for indicating and/or measuring the change of distance between the carriages includes a potentiometer upon one of the carriages and a link with the other carriage, by means of which the potentiometer is operated as the carriages move relative to one another to provide a continuously variable signal which is used to apply to apparatus which indicate and/or measures the change of distance between the carriages.

The invention still further consists in an apparatus as set forth above in which the means for indicating and/or measuring the change of distance between the carriages includes a graph drawing machine in which the recording medium moves at a constant rate through the machine, and the recording pen moves across the direction of motion of the recording medium to represent the value of stress applied to the sample, while the operation of the switch operated by the toothed bar causes a signal to be applied to the recording pen to cause it to give an indication upon the line denoting stress periodcally as the switch operates to indicate the change in distance between the carriages and hence the distance between the datum marks.

The invention still further consists in an apparatus as set forth above in which the means for indicating and/or measuring the change of distance between the carriages includes and X-Y recorder, in which the motion of the recording pen along one of the axes represents the degree of stress applied to the test sample, while the motion of the recording pen along the other of the axes represents the distance between the carriages and thus the distance between the datum marks.

The invention still further consists in an apparatus as set forth above in which the gain in the or each loop comprising the electric lamp, the datum mark, the photo-cell, the means for comparing the signals in the pair of signals from the photo-cell and one with the other, the amplifying means for the difference signals and the electric motor, is variable by automatic gain controls the first of which is a coarse control operated by the combined currents flowing by was of the two electrodes of the photo electric cell, to maintain a substantially constant loop gain both when the carriage is stationary and when in motion, and a second of which is a fine control which is operated by spurious increase of the level of the different signal above the level adopted by the first gain control, due to vibration or other mechanical effects resulting from motion of the carriage or vibration introduced from the exterior of the apparatus, to limit the gain in the loop to a predetermined maximum level.

The invention still further consists in an apparatus as set forth in the preceding paragraph in which the second automatic gain control is operated by a signal representative of the average noise component of the difference signal applied to the motor, while the said predetermined maximum level is that necessary for the optimum performance of the apparatus without risk of the system becoming unstable.

The invention still further consists in an apparatus as set forth above in which the means for comparing the signals from the photocell, the one with the other and deriving a difference signal is a differential amplifier provided with a negative feedback loop, the effect of which is varied by the incorporation of a field effect transistor acting as a variable resistor which is biased by signals provided by both the coarse automatic gain control and the fine automatic gain control.

The accompanying drawings show, by way of example only, one embodiment of the invention, particularly but not exclusively suitable for use with testpieces of an elastomeric material in which:

FIG. 1 is a side elevation of the two carriages of a testing apparatus in their relative positions before the commencement of a test, while at FIG. 1a is shown in elevation a testpiece of the kind shown in side elevation if FIG. 1;

Figures 1, 1A:
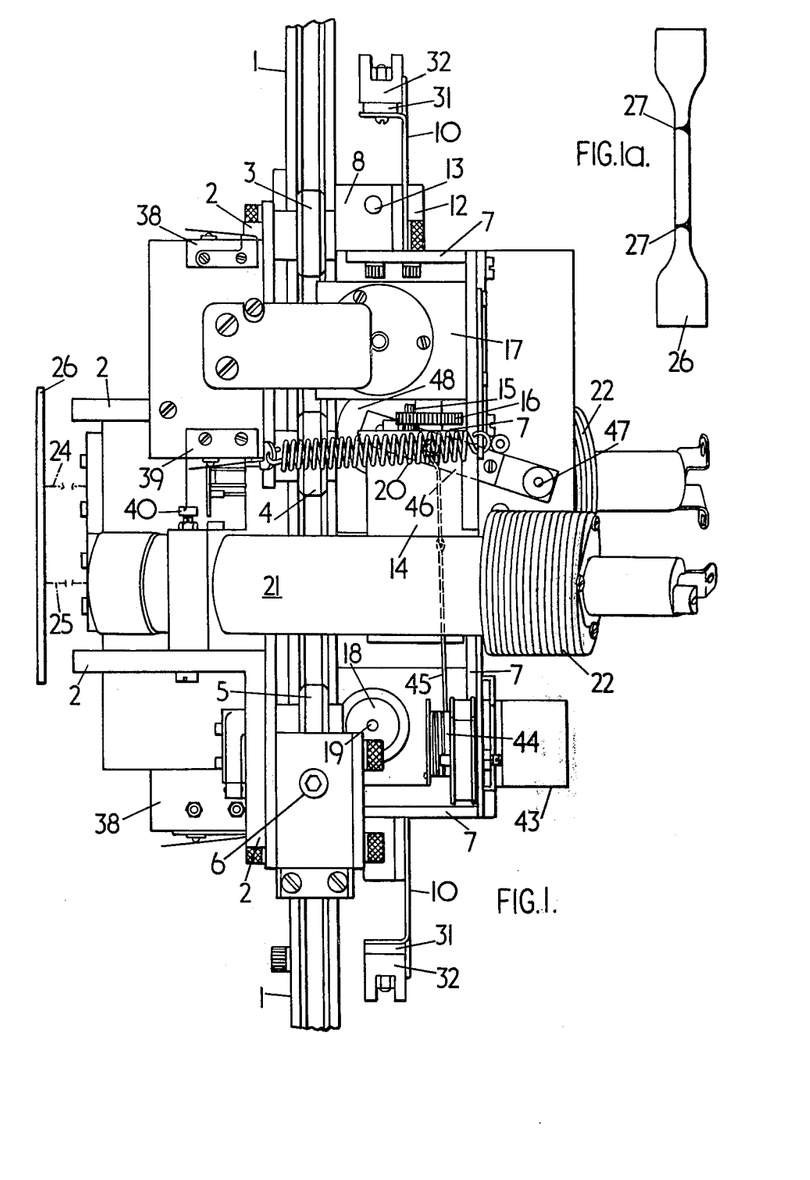
Figure 2:
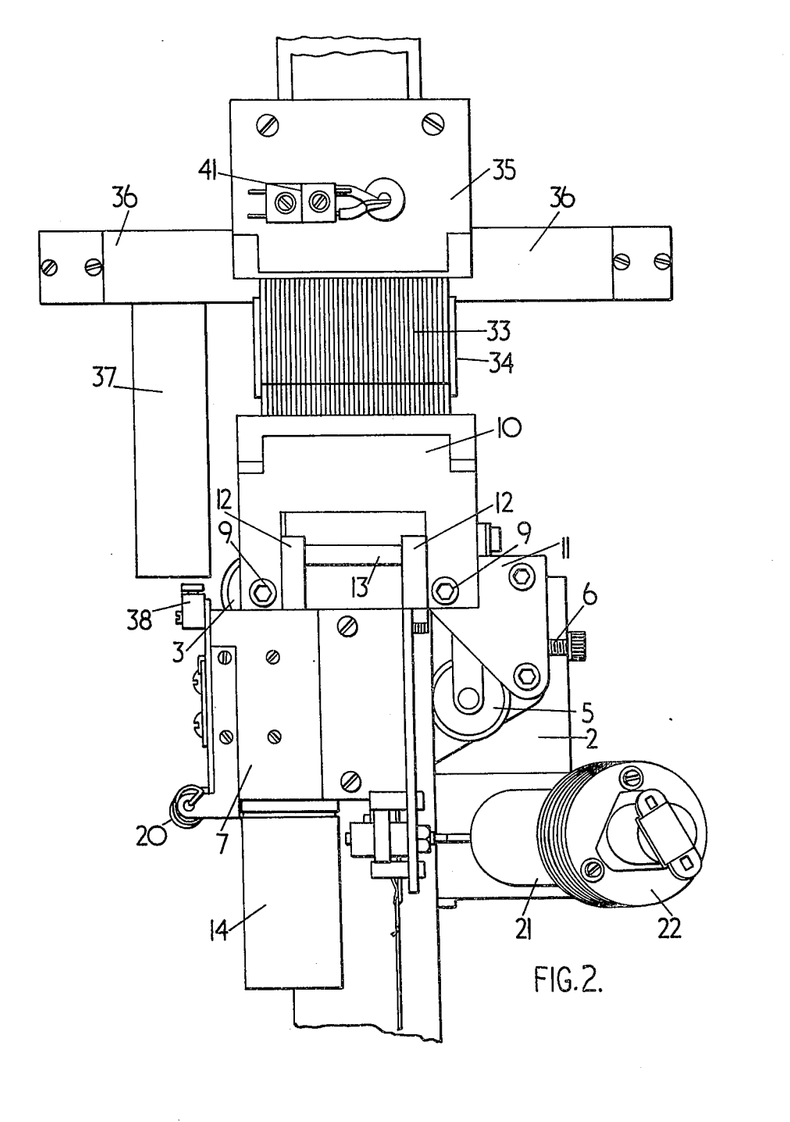
FIG. 2 is an elevation of the upper carriage at the side remote from the testpiece.
Figure 3:
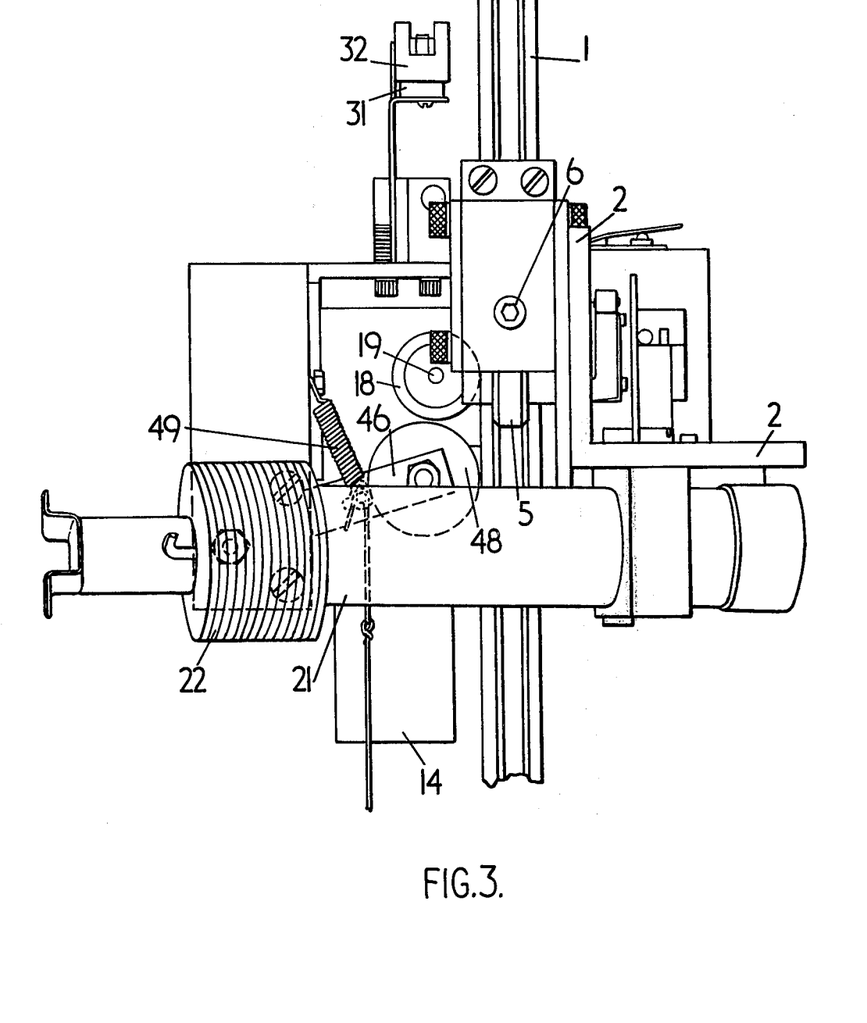
FIG. 3 is a side elevation of the top carriage opposite to that shown in FIG. 1.
Figures 4, 6:
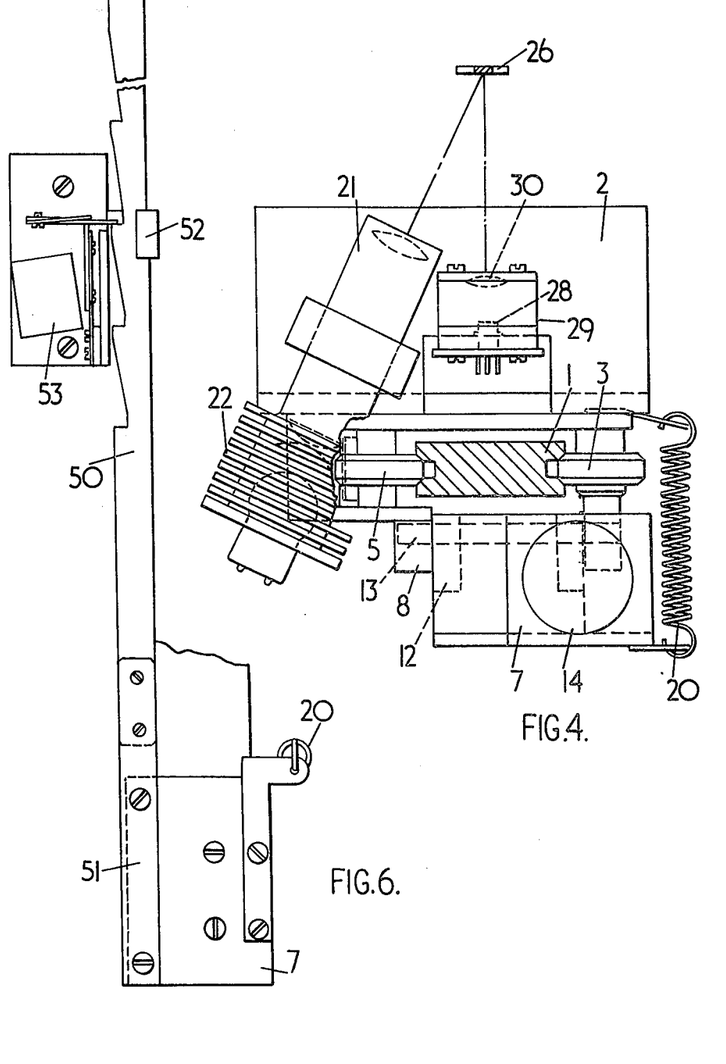
FIG. 4 is a plan view of the lower carriage.
FIG. 6 shows a construction which is usuable alternatively to provide an intermittent signals as the carriages move apart.
Figure 5:
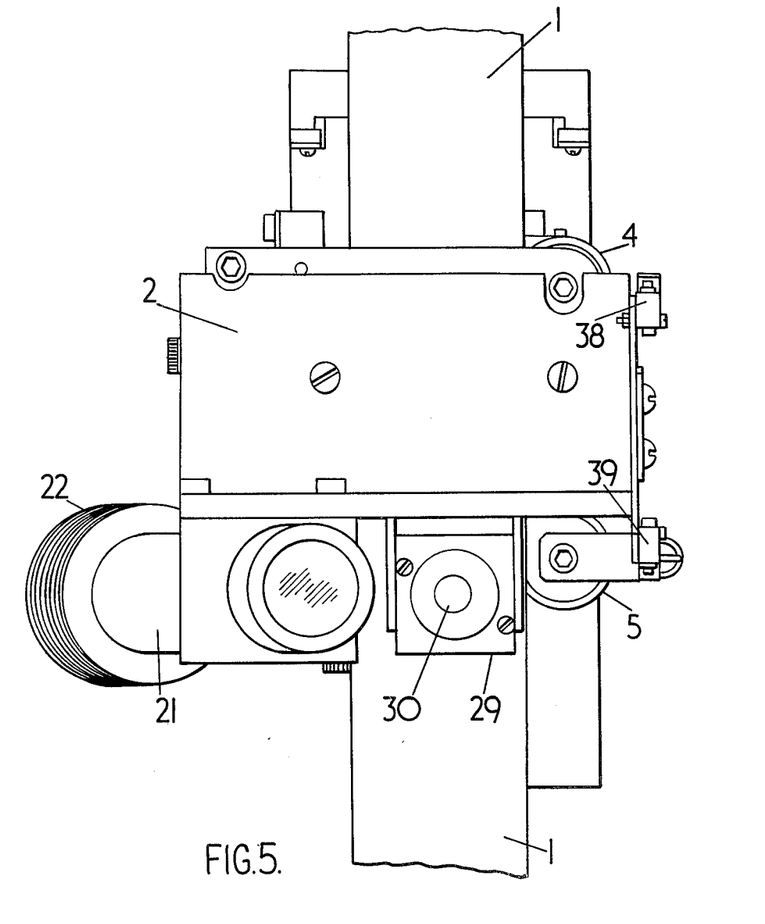
FIG. 5 is an elevation of the top carriage on the side facing the testpiece.

FIG. 1 shows the mechanical arrangement of an apparatus adapted to follow the movement of two datum marks upon a testpiece of extensible material being tested, and comprises a vertical pillar 1, supported from a base, not shown, which is rectangular in cross-section with V-grooves in its opposite edges, as may be seen from FIG. 4. Upon the pillar 1 are supported two carriages, generally of L-shape, a lower one and an upper one 2, 2. Both carriages are similar and are opposite ways up, so that the side of one carriage seen in FIG. 1 is the same as the opposite side of the other carriage, except for minor details.

Each carriage 2 is provided with three wheels, wheels 3 and 4 on one edge of the pillar and wheel 5 on the other edge of the pillar. The pressure of the wheel 5 upon the pillar is adjustable by means of the milled headed bolt 6, so as to provide a close rolling fit. The U-shaped member 7 is pivotably attached to the carriage by the pivot blocks 8 attached by the nuts and bolts 9 to the plate 10 in turn supported by the triangular plate 11 and the end of the shaft of the wheel 3 from the carriage 2. The U-shaped member 7 also is provided with a pair of blocks 12, while a rod 13 passes through bores in both the pivot blocks 8 and the blocks 12. Consequently the U-shaped member 7 may be hinged away from the pillar 1.

The U-shaped member 7 carries a small reversible electric motor 14, having a pinion 15 which drives the input pinion 16 of a gear box 17, also mounted on the U-shaped member 7. On the opposite side of the gear box 17 is a wheel 18 with a rubber surface, which is mounted upon the output shaft 19 of the gear box 17. The helical spring 20 urges the U-shaped member 7 towards the pillar 1 and in consequence the wheel 18 makes contact therewith and when the motor operates the carriage is driven along the pillar.

The carriage 2 also supports a lamp housing 21 which includes a lamp receptacle 22, and a optical system within the housing. Terminals are provided for electrical connection to the lamp in the receptacle 22. The lines 24 and 25 in FIG. 1 represent the axes of the beams projected by the lamps on the two carriages, and shown impinging upon the testpiece 26, which is also shown in FIG. 1a in elevation, to show the shape of the testpiece and the nature of the preferred shape of datum marks thereon.

If the datum mark is a thin line on a non-extensible material the width of the line will not change with motion of the datum mark but in the use of the invention in an apparatus such as that illustrated where the testpiece is extended, the width of the datum mark widens as the stress is increased. In the case of rubber such extension may exceed ten times its normal length, and a simple line marking is either too thin at the start, or too thick at the end of the test. However, a "flared" mark 27 with an outline in the form of two opposing exponential curves, as shown in FIG. 1a, is preferred, seeing that this results in a datum mark which is sufficiently narrow for accurate alignment at some position along its length, however much it may be stretched out in width.

As previously mentioned the testpiece 26 is gripped at both ends and a stress is applied to one of the ends, in a manner well known, and is therefore unnecessary to describe and illustrate the known apparatus used for this prupose.

There is also mounted upon each carriage a photoelectric cell 28 in a box 29 together with a lens 30, which projects an image of the associated datum mark on the photo sensitive electrodes of the cell.

The photocell has two sensitive electrodes the rectilinear boundary between which is positioned at right angles to the axis of the pillar 1. When the photo-cell is opposite its associated datum mark, the image is symmetrically disposed each side of said boundary, and the current produced by the two electrodes is equal. When the bench mark moves relative to the two electrodes, the currents produced are unequal and it is this inequality which is utilised to operate the associated electric motor to restore the image to symmetry with said boundary. The method of achieving this will be described hereinafter.

In order that the carriages may be connected to the necessary associated electrical apparatus, each carriage is provided with a multiple pin plug 31 supported on the plate 10, which receives a socket 32 to which are connected in a line the wires of the flexible spring like cable of the kind which is wound around a reel at its centre and in consequence of which the ends may be withdrawn from one another and when released winds itself upon the reel by the spring action.

The further end of the cable is terminated in a plug and socket mounted upon a plate 35 provided with support means 36 for attaching it to the position beyond the extreme position to which the associated carriage is required to move during a test. The support means 36 is provided with a stop 37 which contacts a switch 38 to stop the motor 14 at the limit of movement of the carriage. Similar means are provided on both carriages.

Similarly a switch 39 is provided on the adjacent sides of the carriages which is operated by an adjustable bolt 40 on the other carriage to prevent the carriages approaching too close to one another.

It will be appreciated that in order to facilitate the servicing of the apparatus a number of plugs and sockets such as shown at 41 are provided, but the wiring between the components parts and other plugs and sockets and terminals blocks are not shown in order to facilitate the understanding of the drawings and remove any possibility of confusion.

One object of the apparatus illustrated is to provide a signal representative of the distance between the datum marks, either at predetermined steps in the elongation of the testpiece, or as a signal continuously representative of the distance between the datum marks. For the second purpose there is provided upon the lower carriage as show in FIG. 1 a potentiometer 43 operated by a drum 44 around which is wound a flexible cable 45, the other end of which is attached to a lever 46 pivoted at 47 and carrying a wheel 48 held out of contact with the pillar 1 by the spring 49. When the cable is fully unwound from the drum 44 the cable pulls on the lever 46 and the wheel contacts the pillar and the U-shaped member 7 is hinged away from the pillar and the drive by the upper motor is interrupted. The drum 44 contains a helical spring which acts continuously to pull on the cable 45 and so always keep it taut. The value of the potentiometer may be used to provide a signal proportional to the movement of the datum marks away from one another.

When an intermittent signal is required, the construction shown in FIG. 6 is used in substitution for the potentiometer and cable. The construction of FIG. 6 comprises a toothed strip 50 hingeably connected to a strip 51 fastened to the U-shaped member 7 on one of the carriages and slidable through a guide 52 on the other carriage. The teeth on the strip 50 operate a switch 53 on the other carriage and the circuit is influenced each time a tooth passes. If the distances between the teeth are equal to one another and to the distance between the datum marks before elongation takes place, the signals will represent 100% increments of elongation of the testpiece.

The toothed strip may be provided with a closely toothed rack operating a mechanical counter by means of a pinion engaging the rack, so as to provide an indication of the total separation of the carriages in suitable units of length.

As a still further alternative a rotary digital encoder can be substituted for the potentiometer.

As is mentioned in the introduction to this description the choice of the three alternative methods of producing a signal representing the elongation of the testpiece may be applied to indicating and/or recording means of the three kinds referred to or to other means as desired.

Other means for measuring the strain may be used without departing from the scope of the invention, the means abovedescribed being merely by way of example only.

Before proceeding with the description of the electrical circuits for dealing with the signals provided by the photo-electric cells and driving the electric motors in the apparatus described and illustrated having two carriages for carrying out a test upon an extensible testpiece, it should be borne in mind that the invention is not limited to such apparatus having two like carriages, seeing that for example with a single carriage the movement of a single datum makr may be followed, and its position determined relative to a fixed point, and it can therefore be appreciated that as far as the means for following the bench marks are concerned, the carriages and the electrical circuits associated therewith are mere duplication the one of the other.

Figures 7, 8:
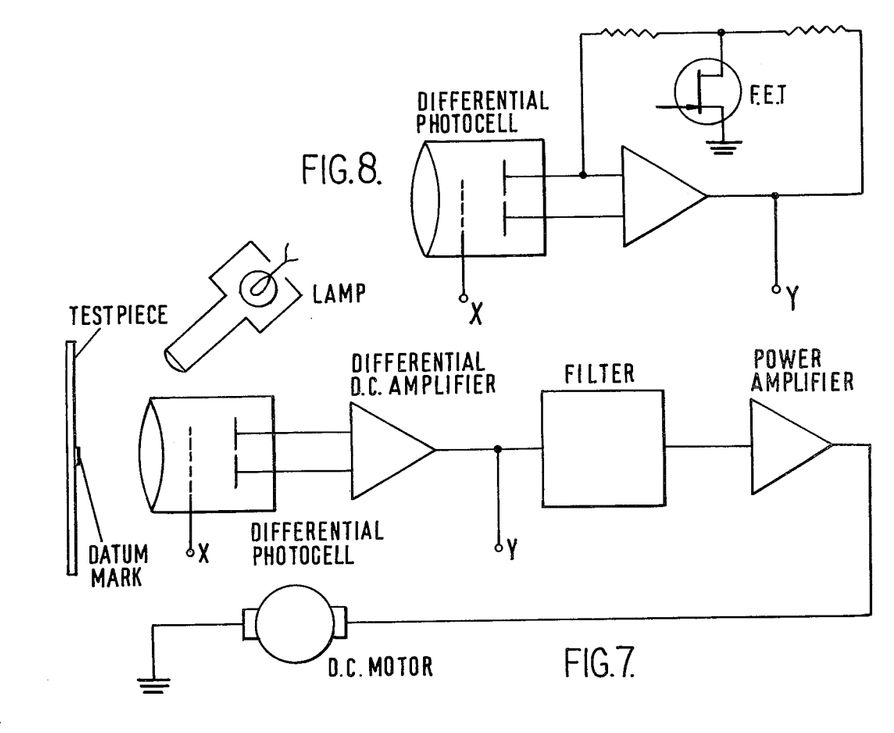
FIG. 7 is a simplified block diagram of one loop.
FIG. 8 is a circuit diagram showing how the loop gain including the circuit of FIG. 7 is varied by means of a field-effect transistor.

FIG. 7 shows a simplified diagram of the loop including the lamp, the testpiece and one datum mark, the differential photo-cell, the differential D.C. amplifier for comparing the two signals from the photo-cell and deriving a difference or error signal therefrom which represents the error in alignment of the image of the datum mark on the photo-cell, the filter, which is required to produce stability in the closed loop system, and which assists in keeping the error signal small and maintain a good dynmic performance even up to the maximum speed and acceleration of the motor, the D.C. power amplifier for amplifying the signal sufficiently to drives the D.C. motor, and the motor.

Even when the filter characteristics are optimised there is an upper limit to the loop gain, beyond which the system will become unstable causing the carriage to oscillate about the position of alignment. Conversely, if the loop gain is too low, a large optical error is needed to make the system respond, resulting in an undersirable dead space on either side of the position of alignment. If the photo cell is to be arranged to follow the datum mark precisely the loop gain must be arranged to be adequate without becoming excessive.

The loop gain is affected by the brightness of the lamp, the size of testpiece and/or datum mark, and the effective contrast of the latter, the efficiency of the optical system including the photo-cell, the sensitivity/efficiency of the motor and associated mechanical parts, and the overall gain of the electronic circuits.

The greatest change of gain of the loop is brought about by the change of width of the testpiece and change of width of the datum as the testpiece is extended, while the characteristics of the other items in the loop will vary over a period of time, but also are significant. The loop gain therefore varies due to long term and short term effects all of which are detrimental to the efficient operation of the apparatus.

In order to control the loop gain and to maintain it substantially at a constant value, while keeping the performance at or near its optimum condition a coarse automatic loop gain control is provided. One way of doing this is to apply a negative feedback to the differential amplifier in the manner as shown in FIG. 8, where a field-effect transistor (FET) is utilised as a variable resistor controlled by a bias and connected between the earth line and the junction between two resistors, the one connected to the output of the amplifier, while the other is connected to that input which provides an inverting signal from one of the electrodes of the photo-cell. The gain of the differential amplifier can thus be automatically controlled and the loop gain thus maintained at the desired level when the individual gain of any of the items in the loop varies.

The bias for operating the coarse automatic gain control above referred to may be derived in various ways, but one of the simplest is to utilise the total current passing through the photo-cell, which is proportional to the total light falling on it, and then to amplify it and use it to generate the bias voltage for the F.E.T.

The exact way of doing this is described hereinafter in relation to FIG. 9. The terminal X of FIGS. 7 and 8 is where this total current of the photo-cell is derived.

By this simple technique one is able to compensate for the large variations in loop gain and provide a considerable improvement over an uncompensated system. However, because the F.E.T. resistance/bias characteristic is non-linear and because the total light falling on the photo-cell is only a general indication of change of loop gain due to the variables above mentioned, this technique is unsuitable for any more than a coarse control of the gain. Because of this a fine automatic gain control is also incorporated. This latter control is influenced by the smoothness or raggedness of the amplified error signal, the amount of raggedness being a good indication of the loop gain. This raggedness is due to factors such as judder in the mechanical drive and the combined effects of vibration on the specimen and apparatus as a whole.

The fine control is therefore designed to sense the amplitude of the noise component of the average error signal, and to vary the bias voltage to the F.E.T. in such manner as to maintain the noise component at a predetermined ratio of the error signal. The optimum ratio is not likely to change in any one system, but may vary between systems.

The advantage of such a fine control system is that it permits one to provide a close degree of control which allows the system to operate near its optimum performance level without risk of instability.

The coarse control previously referred to and the fine control just referred to operate together, the former both when the carriages are stationary and moving, while the latter provides more exact compensation when the datum mark is moving.

Although it is preferred to apply the automatic gain control in the manner above described, the loop gain compensation may be applied alternatively to the lamp or the photo-cell, for example by positioning a variable shutter in the path of the light and controlling it by the automatic loop gain control.

Figure 9:
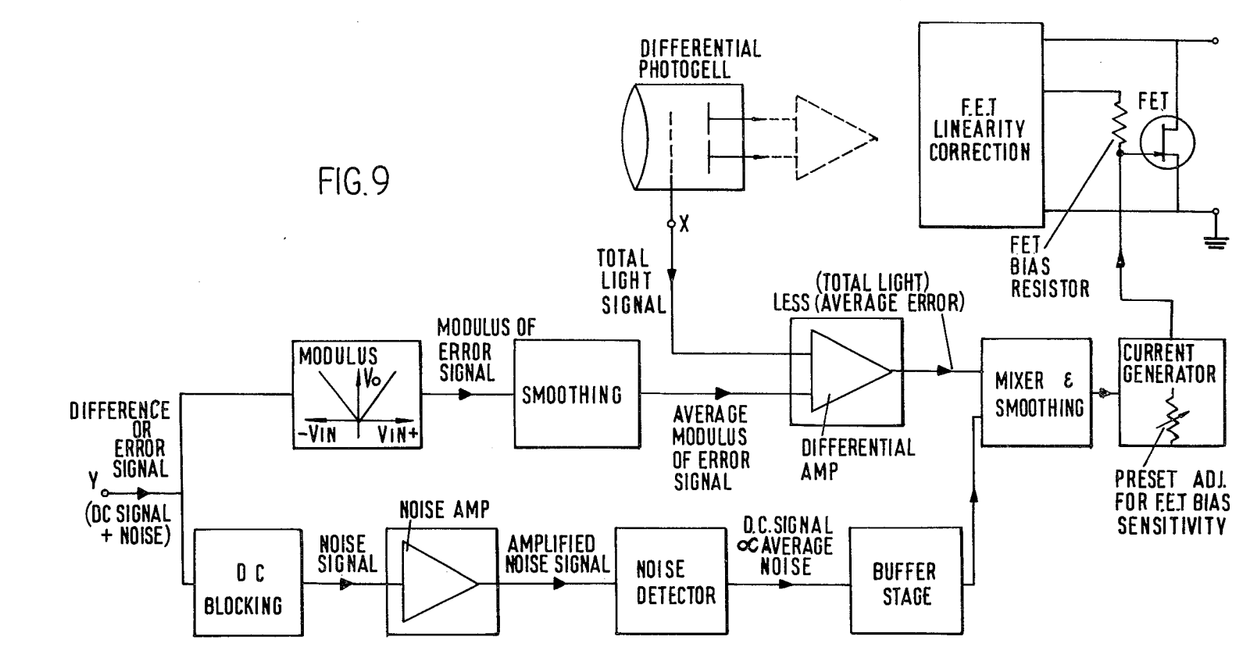
FIG. 9 is a block diagram showing how both the total photocell current and the difference signal are utilised to provide coarse and fine automatic loop gain by way of the circuit of FIG. 8.

FIG. 9 shows a block diagram of the two automatic gain controls as applied to the F.E.T. of FIG. 8, which is self explanatory, except to say that the F.E.T. at the top right corner of FIG. 9 is the F.E.T. of FIG. 8. It will be clear that the terminal X below the differential photo-cell is the terminal X of FIGS. 7 and 8, while the terminal Y to the left of FIG. 9 is the terminal Y of FIGS. 7 and 8.

The F.E.T. linearity correction block improves the linearity of the F.E.T. resistance characteristic, i.e. its drain current/drain-source voltage, thus making it effectively linear over the voltage range applied to it in the circuit of FIG. 8.

The total light signal from the differential photo cell is fed to one input of the total light average above described and thence to a mixer/smoothing circuit which controls the output of a current generator. The output of the latter passes through the F.E.T. bias resistor, thus generating a bias voltage proportional to the total light falling on the photocell. This is the only effect when there is no difference or error signal. When an error signal is present the modulus block produces a similar output, but always of the same sense (regardless whether the error signal is positive or negative) and such as to oppose the total light signal. Thus it reduces the effect of the latter and in turn the F.E.T. bias voltage. The overall effect is to increase the loop gain.

When the loop gain is increased to a point where a significant noise signal is superimposed on the difference or error signal, the remaining blocks of the diagram of FIG. 9 come into operation. The D.C. blocking section removes the D.C. component, feeding only the noise to the noise amplifier and noise detector, which produces a D.C. output proportional to the average noise signal. For convenience in the circuitry, the latter passes through a buffer stage and thence to the mixer/smoothing circuit in such a sense as to increase the F.E.T. bias and reduce the loop gain. Thus the F.E.T. bias and loop gain tend to settle at a level where the average noise is just sufficient to counteract the average error, providing the fine automatic gain control.

The apparatus may be provided with a control box with press buttons or other switches, by which the operation of the apparatus may be controlled. After a test has been carried out and the testpiece has been ruptured, the carriages will be wide apart and it is necessary to bring them together in order to commence a new test. For this purpose the automatic operation of each carriage is interrupted by switching, and the carriages are moved up or down as the case may be by further switching and control of the motor speed by a manual control, until the carriages are positioned correctly for the next test. The apparatus is then switched over to automatic operation. It may also be necessary to stop the apparatus during a test or at the instant of rupture of the testpiece, and for this purpose a further switch is provided, which immobilises the carriages. Such a stop switch may also be associated with the recording and/or indicating means previously referred to, and the means for applying a stress to the testpiece, so that a test may be interrupted or delayed for any period desired.

Although it has been previously stated that the embodiments illustrated are particularly, but not exclusively suitable for use with testpieces of an elastomeric material, it will be perfectly clear to anyone skilled in this art that the apparatus above described is independent of the testpiece in a mechanical sense, and the desired information is passed from the workpiece to the apparatus by reason of the motion of the datum mark and hence the change of position of the image of the latter upon the photo-cell. Consequently, the nature of the material of which the test pieces are made, theoretically at least, does not affect the mode of operation of the apparatus, it being first necessary that the material is capable of having a bench mark applied thereto and secondly that the light reflective characteristics of the datum mark must be different from that of the testpiece for reasons which by now will be clearly understood. In practice, it has been found, as mentioned in the introduction to this specification, that the material may be rigid and substantial at one end of a range of materials and be extremely fragile and of samll cross-sectional area at the other end of the range, and it depends upon the degree of resolution required as to the precise manner in which the apparatus is mechanically constructed.

Where it is required to provide an apparatus of high resolution, for example one in which the carriages will precisely follow such minute movements of the datum marks even as small as 0.00005 inch, the mechanical parts of the apparatus must be made with high precision. For example, the pillar 1 may be in a form similar to an optical bench, and have highly accurately formed mirror like parallel faces which are engaged on one side by a pair of spaced accurately ground pads upon the associated carriage and on the other side by a spring loaded pad which maintains the carriage in intimate contact with the said pads, and thereby ensures a highly accurate path for the carriage without any possibility of deflection from a straight path.

The carriage may be moved longitudinally by means of a rack fastened to the pillar and engaged by a pinion driven by the electric motor by way of a gear box, which, for high resolution puspores, is provided with a reduction gear of high ratio consistent with the resolution desired. The carriage may also be provided with accurately ground pads engaging the sides of the pillar at right angles to those mentioned above to obtain equal accuracy movement in this plane also. Other ways of constructing the sides for the carriages may also be used with equal success.

It will therefore be clear from the above that the apparatus constructed in accordance with the invention has wide fields of applications and it is therefore to be understood that the above description is by way of example only and that details for carrying the invention into effect may be varied as are appropriate without departing from the scope of the invention claimed.

We claim:

1. An apparatus for following the motion of a datum mark characterised in comprising a rectilinear rail, a carriage movable longitudinally of the rail and supported thereby, a reversible electric motor on the carriage the drive of which makes driving engagement with the rail, an electric lamp means on the carriage arranged to illuminate a datum mark positioned adjacent the rail, a photo-electric cell on the carriage having a pair of light sensitive electrodes closely adjacent one another, optical means for projecting an image of a datum mark on the light sensitive electrodes of the photo-electric cell, boundary between the electrodes being rectinilinear and at right angles to the longitudinal axis of the rail, means for deriving an electric signal from each light sensitive electrode of the photocell means, for comparing the signals the one with the other and deriving a difference signal therefrom, means for amplifying the difference signal and means for applying the difference signal to the electric motor of a polarity as will operate the motor in that direction of rotation as will tend to maintain or will move the carriage in such direction as to restore the position of the image of the datum mark symmetrical with the boundary between the electrodes in the photocell as and when the datum mark moves along the path parallel to the said rail.

2. An apparatus as claimed in claim 1 in which the gain in a loop comprising the electric lamp, the datum mark, the photo cell, the means for comparing the signals in the pair of signals from the photo cell the one with the other, the amplifying means for the difference signal and the electric motor, is variable by automatic gain controls a first of which is a coarse control operated by the combined currents flowing by way of the two electrodes of the photo electric cell, to maintain a substantially constant loop gain both when the carriage is stationary and when in motion, and a second of which is a fine control which is operated by spurious increases in the level of the difference signal above the level adopted by the first gain control, due to vibration or other mechanical effects resulting from motion of the carriage or vibration introduced from the exterior of the apparatus, to limit the gain in the loop to a predetermined maximum level.

3. An apparatus as claimed in claim 2 in which the second automatic gain control is operated by a signal representative of the average noise component of the difference signal applied to the motor, while the said predetermined maximum level is that necessary for the optimum performance of the apparatus without risk of the system becoming unstable.

4. An apparatus as claimed in claim 2 in which the means for comparing the signals from the photocell, the one with the other and deriving a difference signal is a differential amplifier provided with a negative feedback loop, the effect of which is varied by the incorporation of a field effect transistor acting as a variable resistor which is biased by signals provided by both the coarse automatic gain control and the fine automatic gain control.

5. An apparatus for following the motion of each of a pair of datum marks in a direction transversely of a pair of parallel imaginary lines, the position of each of which datum marks is provided to indicate and in which the light reflective characteristic of each datum mark is different from a medium which supports the pair of datum marks, comprising a rectilinear rail, a pair of carriages movable longitudinally of the rail and supported thereby, a reversible electric motor on each carriage, the driving member of which makes driving engagement with the rail, and an electric lamp means on each carriage arranged to illuminate an associated datum mark positioned adjacent the rail, a photo-electric cell on each carriage, each cell having a pair of light sensitive electrodes closely adjacent one another, optical means for projecting an image of the respective datum marks on the light sensitive electrodes of the photo-electric cells, the boundary between the electrodes being rectilinear and at right angles to the longitudinal axis of the rail, means for deriving an electric signal from each light sensitive electrode of each cell, means for comparing the signals in each pair of signals the one with the other and deriving a difference signal therefrom, means for amplifying each of the difference signals separately and means for applying the difference signals to the respective motors of a polarity which will operate the motor in that direction of rotation as will tend to maintain or will move the carriage in such direction as to restore the position of the image of the datum mark symmetrical with the boundary between the electrodes in each photo-electric cell as and when the respective datum mark moves along a path parallel to the said rail.

6. An apparatus as claimed in claim 5 in which a test piece is mounted between support means at least one of which is movable away from the other to stress the testpiece in a direction parallel to the said rail, and in which there are provided upon the testpiece a pair of datum marks which indicate imaginary lines across the testpiece initially at a predetermined distance apart, so that as the testpiece is stressed the datum marks become further separated and the carriages move upon the rail to follow the movements of the datum marks, there being provided means for indicating and/or measuring the change of distance between the carriages and in consequence the strain imparted to the testpiece by the stress.

7. An apparatus as claimed in claim 6 in which the means for indicating and/or measuring the change of distance between the carriages includes a toothed bar supported at one end on one of the carriages and slidable adjacent an electric switch on the other carriage, so that with relative movement of the carriages away from one another the electric switch is operated by a tooth on the bar, the teeth on the bar being equally spaced so that with separation of the carriages the switch operates in a predetermined relationship with a change of distance between the carriages.

8. An apparatus as claimed in claim 6 in which the means for indicating and/or measuring the change of distance between the carriages includes a potentiometer upon one of the carriages and a link with the other carriage, by means of which the potentiometer is operated as the carriages move relative to one another to provide a continuously variable signal.

* * * * *